(No Model.)
J. E. HOLMES.
Apparatus for Extracting Gold and Silver from Ores.
No. 242,646. Patented June 7, 1881.
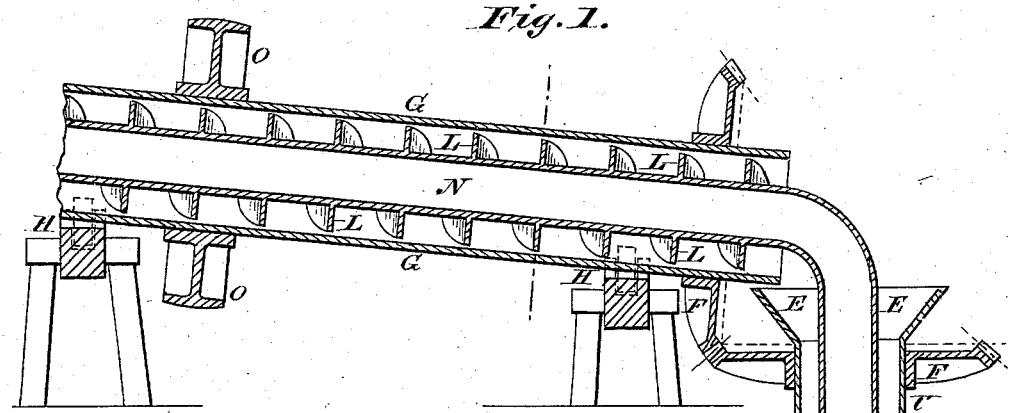
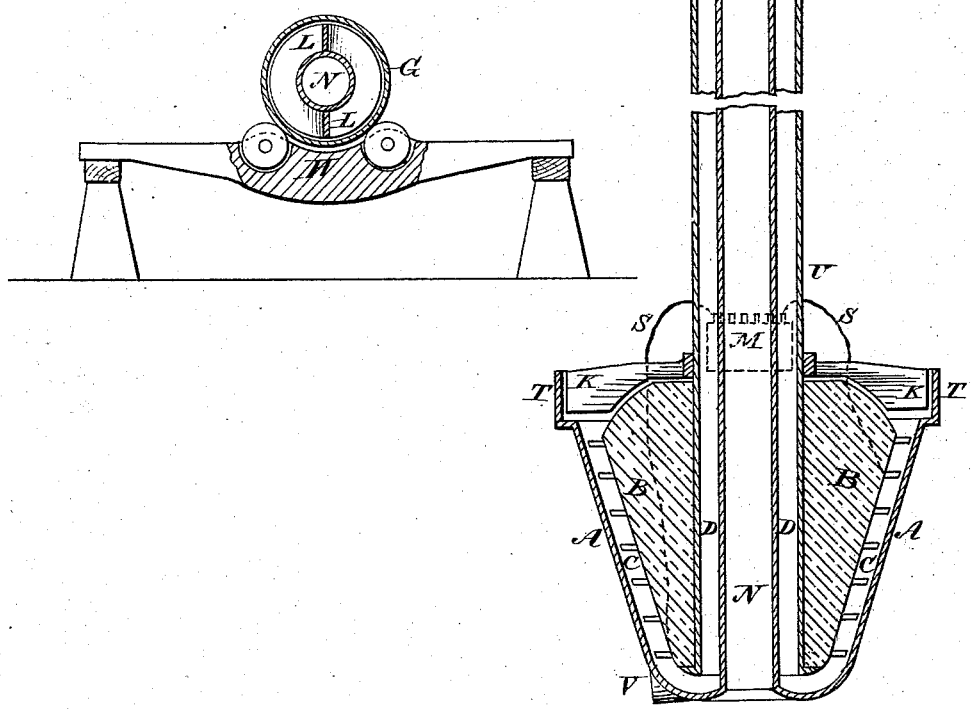
Witnesses:
Geo. F. Graham
L. C. Young
Inventor:
Joseph E. Holmes

UNITED STATES PATENT OFFICE.

JOSEPH E. HOLMES, OF WASHINGTON, DISTRICT OF COLUMBIA.

APPARATUS FOR EXTRACTING GOLD AND SILVER FROM ORES.

SPECIFICATION forming part of Letters Patent No. 242,646, dated June 7, 1881.

Application filed March 22, 1881. (No model.)

*To all whom it may concern:*

Be it known that I, JOSEPH E. HOLMES, a citizen of the United States, residing at Washington, in the District of Columbia, have invented certain new and useful Improvements in Apparatus for Extracting Gold and Silver from Ores; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a sectional elevation of the amalgamating-pot and the apparatus for drying and conveying the pulverized ore through it. Fig. 2 is a cross-section of the flue-pipe N and its surrounding cylinder G in its bearings H.

Other and various forms of apparatus have been devised for using molten lead and zinc, and for dry amalgamation, but each have proved faulty and expensive.

The object of my invention is to overcome the defects heretofore existing in this class of apparatus for the reduction of ores, and to operate the same with great rapidity and economy.

My invention relates to a certain apparatus whereby ores may be treated dry and the metals extracted, either as base bullion or amalgam, the construction of the apparatus being such that the ore, after being pulverized dry, is handled automatically throughout.

Referring to the drawings, A A is a pot for melting lead, zinc, or other metals, and for holding and warming mercury when used for amalgamating gold and silver.

N is a central pipe or flue arising from the bottom of the pot A, through which the smoke and surplus heat are conducted.

R is a larger pipe or cylinder surrounding the flue-pipe N, for conducting the fine ore, and also supporting the displacer B.

E is the funnel for receiving the pulverized ore and conveying it into the pipe R.

D is the space between the pipes N and R, down which the fine dry ore is carried nearly to the bottom of the pot A and discharged into the fluid metal.

B is a displacer surrounding and supported by the cylinder R, such displacer acting as an agitator and interrupter, reducing materially the amount of fluid metal at one time while working the apparatus.

C represents rings, blades, or fingers attached to the displacer to interrupt the too rapid rising of the ore through the fluid metal. They are preferably constructed so that the spaces in one series of blades are covered by the series above alternately. When the cylinder R and displacer B are in motion the ore is stirred and the fluid metal agitated, so as to bring more of the particles of the precious metals in contact with the amalgamating metal.

M is an electric battery, resting upon the displacer and revolving with it. Other methods of generating electricity and applying it may be used.

S S are the conductors, leading from the battery M through the displacer B to the points desired, to bring the electricity into contact with the fluid metal and ore.

T is a hoop or curb fitting on the top and outer rim of the pot A, with one or more openings to permit the escape of the waste earthy matter or tailings.

K K are the arms or scoopers attached to the cylinder R for removing the surplus tailings. Several inches, or enough to protect the fluid metal from oxidizing by air-contact, of the tailings are kept over the surface of the fluid metal and below the sweep of the scoopers K K when rotated.

G is a cylinder surrounding the continuation of the flue-pipe N beyond the funnel E, for receiving, drying, and conveying pulverized ore into the funnel E.

L is a screw-blade to move the ore in the cylinder G and deliver it regularly into the cylinder R, so that an even and regular supply of ore can be automatically passed into and out of the pot A.

U U are collars to keep the cylinder R firmly in place while rotating and the displacer B in proper position in the pot A.

H, Fig. 2, and H H, Fig. 1, are the bearings of cylinder G.

F F are the bevel-gears connected with and to rotate the cylinders G and R.

O is the pulley that gives motion to the cylinder G, and by its bevel-gear F gives motion to the cylinder R, and thus rotates the agitators C, battery M, conductors S S, and the scoopers K K.

V is a boss for inserting a plug to be removed for drawing off the molten mass or mercury when desirable. The draw-off spout is made of soapstone or fire-tile.

The furnace in which the pot A A is set is not shown. Any suitable device that insures the proper heating of the pot, and at pleasure passing the smoke and surplus heat up the flue N, will answer.

The operation is as follows: A fire is first built in the furnace, the displacer having been raised out of the pot A and suspended. Lead or zinc in the desired quantity is placed in the pot, and when melted the displacer is lowered to its place near the bottom of the pot. The metal at this time ought not to reach higher than four or five inches of the top of the pot. Dry ore is now fed into the funnel E, which must be at a sufficient height so that the quantity of ore fed into the space D shall, by its own weight, press down the fluid metal occupying the lower part thereof, so as to permit the passage of the ore out of the bottom of the pipe into the fluid metal, whence it will rise quickly to the top and cover the space between the top of the metal and the top of the pot and form a covering to prevent oxidation. Ore may be fed into the funnel E by any suitable device, but the one represented in Fig. 1 is efficient. Motion may now be given through the pulley O to the cylinder G, when the fine dry ore placed in the end farthest from the funnel E is carried forward and emptied into the funnel E and descends into the molten metal, where it is by the rotation of the displacer and agitator B C hindered in its ascent until all the particles of gold and silver have been taken up by the molten metal. When mercury instead of molten metal is used less heat is required. The scoopers remove the worthless tailings as they rise, and the process continues until the base bullion is sufficiently rich, when the plug in the boss V is removed and the bullion drawn off. The plug is then replaced, more lead placed in the pot A, and the operation continued.

Having thus described my invention, what I claim, and desire to secure by Letters Patent, is—

1. A melting-pot for amalgamating the precious metals, of cylindrical and concave form, having an upright internal central flue-pipe arising from the bottom of the pot and extending through the same for the better heating of the metal, and utilizing the smoke and surplus heat to dry and heat the ore to be treated.

2. The combination of the pot A, the cylinder R, with its funnel E, surrounding the flue-pipe N, the displacer B, the interrupter C, the battery M, the conductors S S, and the scoopers K K, substantially as described, and for the purposes set forth.

3. The combination of the extended and inclined flue N, the cylinders R and G, the screw L, the pulley O, the bevel-gears F F, and the bearings H H, substantially as and for the purpose set forth.

In testimony whereof I affix my signature in presence of two witnesses.

JOSEPH E. HOLMES.

Witnesses:
GEO. F. GRAHAM,
L. C. YOUNG.